US008671026B2

(12) United States Patent  
Devries

(10) Patent No.: US 8,671,026 B2  
(45) Date of Patent: *Mar. 11, 2014

(54) METHOD OF FACILITATING VALUE-BASED BARTERING OVER THE INTERNET

(76) Inventor: Derek A. Devries, San Francisco, CA (US)

( * ) Notice: Subject to any disclaimer, the term of this patent is extended or adjusted under 35 U.S.C. 154(b) by 6 days.

This patent is subject to a terminal disclaimer.

(21) Appl. No.: 13/224,046

(22) Filed: Sep. 1, 2011

(65) Prior Publication Data

US 2011/0313891 A1 Dec. 22, 2011

Related U.S. Application Data

(63) Continuation of application No. 12/326,956, filed on Dec. 3, 2008, now Pat. No. 8,099,331.

(51) Int. Cl.  
*G06Q 30/00* (2012.01)

(52) U.S. Cl.  
USPC .................... 705/26.1; 705/26.8; 705/27.1

(58) Field of Classification Search  
USPC ................. 705/26, 27, 26.1, 27.1, 26.8  
See application file for complete search history.

(56) References Cited

U.S. PATENT DOCUMENTS

| | | | | |
|---|---|---|---|---|
| 6,847,938 B1 * | 1/2005 | Moore | ............... | 705/26.41 |
| 7,133,847 B2 * | 11/2006 | Himmelstein | ............. | 705/80 |
| 7,702,545 B1 * | 4/2010 | Compton et al. | ............. | 705/26.9 |
| 7,877,315 B2 * | 1/2011 | Pickering | ............. | 705/37 |
| 2002/0004787 A1 * | 1/2002 | Moshal et al. | ............. | 705/80 |
| 2002/0016760 A1 * | 2/2002 | Pathak | ............. | 705/37 |
| 2002/0032632 A1 * | 3/2002 | Sernet | ............. | 705/37 |
| 2003/0014351 A1 * | 1/2003 | Neff et al. | ............. | 705/37 |
| 2006/0064409 A1 * | 3/2006 | Hardwick | ............. | 707/3 |
| 2006/0167767 A1 * | 7/2006 | Verona | ............. | 705/26 |
| 2007/0124228 A1 * | 5/2007 | Elias et al. | ............. | 705/37 |
| 2009/0271284 A1 * | 10/2009 | Arbib | ............. | 705/26 |

OTHER PUBLICATIONS

"Managing Online Auctions: Current Business and Research Issues," Management Science; Nov. 2003; 49, 11 (Pinker, Edieal; Seidmann, Abraham; Vakat, Yaniv).*

* cited by examiner

*Primary Examiner* — Courtney Stopp

(57) ABSTRACT

A method, apparatus, and system of facilitating value-based bartering over the internet are disclosed. In one embodiment, a system of e-commerce includes a computer network, a server to host a market place website, a listing module to enable an entity to assign a specified value to a good and to list the good for trade on the market place website such that the listing of the good will expire after being posted for a specified period of time, a trade module to enable an entity to trade the good for an other good of an other entity on the market place website, a search module to enable the entity to search a list of goods on the market place website.

6 Claims, 14 Drawing Sheets

FIGURE 4

METHOD OF FACILITATING VALUE-BASED BARTERING OVER THE INTERNET

This disclosure relates generally to an enterprise method, a technical field of software and/or hardware technology and, in one example embodiment, to method of facilitating value-based bartering over the internet. This application is a continuation of application Ser. No. 12/326,956 filed Dec. 3, 2008.

FIELD OF TECHNOLOGY

Background

An entity (a person, a business, etc.) may have a good (e.g., an object and/or a service). The entity may want to trade the good for another type of good. The entity may have to search for another entity with the other type of good. A search for the other type of good may be time consuming (e.g., searching through printed acts, conducting searches with an internet search engine, etc.). The entity may waste time and effort approaching a plurality of other entities with offers to trade. Thus, the entity may list the good on an e-commerce website (e.g., a website that facilitates trading of goods over a computer network). However, the e-commerce website may not allow a direct trade of the good for the other type of good (e.g., a user may have to bid on a listed good and then purchase the listed good for a bid amount). The entity may have to bid and/or wait for the other entity to bid for the other good. A bidding system may also be time consuming. The entity may prefer to barter (e.g., a trade or exchange of goods without using a form of currency) to consummate the trade. The value of the form of currency may not be stable.

Furthermore, a certain number of other users may inconvenience the entity with a number of offers to trade unsuitable goods (e.g., goods of insufficient value, a number of repeated offers that are repeatedly declined by the entity, etc.). The entity may not be able to filter a request from another user to trade. The request may be a result of a search algorithm that allows another user with an undesirable good locate the entity and offer the undesirable good for trade.

Additionally, the entity may also use the search algorithm to locate the other type of good on the e-commerce website. The e-commerce website may list a number of results. Certain results may not be suitable for trade for the good (e.g., may be of an insufficient value). Thus, the entity may waste time and effort reviewing certain results.

SUMMARY

A method, apparatus, and system of facilitating value-based bartering over the internet are disclosed. In one aspect, a system of e-commerce includes a computer network, a server to host a market place website, a listing module to enable an entity to assign a specified value to a good and to list the good for trade on the market place website such that the listing of the good will expire after being posted for a specified period of time, a trade module to enable an entity to trade the good for another good of another entity on the market place website, a search module to enable the entity to search a list of goods on the market place website, and a rule module to govern a trade between the entity and the other entity of the good for the other good such that the entity is able to propose the trade to the other entity if the specified value of the good is at least one of an equal value equal to an other specified value of the other good and a greater-than value greater than the other specified value and such that the entity is able to only propose the trade to the other entity once and such that the entity is not able to alter the specified value of the good once the entity has listed the good.

The system may include a combination module to enable the entity to propose goods to the other entity to trade for the other good if the combined-specified value of the goods of the equal value equal to the other specified value and the greater-than value greater than the other specified value. The system may also include a value decay module to decrease the specified value of the good at a specified set of intervals of time. The system may include a substitute proposal module to enable the other entity to select a substitute good that may be an other equal value equal to the specified value and/or another less-than value lower than the specified value and such that the entity may have chosen to enable a counter proposal of a substitute good upon creation of the proposal of the good and such that an other entity's selection of the substitute good automatically generates a trade of the good for the substitute good.

The entity may have an option to use the value decay module to decrease the specified value of the good at the set of specified intervals of time when the entity initially may list the good on the market place website. A value decay option may be set in a private mode such that the other entity may be unaware that the value decay module decreases the specified value of the good at the set of specified intervals of time and a public mode such that the other entity may be able to view a value decay option setting.

The system may include a bulk trade module to enable the other entity to list goods as being offered for trade in a variable combination and wherein the entity is able to trade the good for certain ones of the goods. The other entity may list the goods with a bulk status when the other entity lists the goods. The bulk status of the goods may not be changed once listed.

The system may include a triangle trade module to enable the other entity to counter offer a triangle trade to the entity as a response to the offer of trade from the entity such the other entity may agree to provide the other good to the entity in exchange for the entity providing the good to a third party and the third party may provide a third-party good to the other entity. The other entity may not be enabled to accept an original offer from the entity once the other party has counter offered the triangle trade. In addition, the third party may use the triangle trade module to generate the triangle trade between the third party, the entity and/or the other entity.

The system may include a template module to enable the entity to list a proposal template such that the other entity is able to complete the proposal template by listing the other good in the proposal template if the other good is of a class of goods allowed by the proposal template such that the entity is enabled to propose the trade.

In another aspect, a method includes assigning a specified value to a good of an entity, listing the good to a list of goods available for trade on a market place website, searching the list of goods for a specified type of goods, structuring a collection of data relating to the list of goods in a physical data base of a computer system trading the good for an other good of an other entity on the market place website according to a set of rules such that the entity is able to propose the trade to the other entity if the specified value of the good is at least one of an equal value equal to an other specified value of the other good and a greater-than value greater than the other specified value and such that the entity is able to only propose to the other entity to trade the good for the other good once and such that the entity is not able to alter the specified value of the good once the entity has listed the good.

The method may include enabling the other entity to select a substitute good that is of an other equal value equal to the specified value and another less-than value lower than the specified value and such that the entity has chosen to enable a counter proposal of a substitute good upon creation of the proposal of the good and such that another entity's selection of the substitute good automatically generates a trade of the good for the substitute good. The entity may have an option to use the value decay module to decrease the specified value of the good at specified intervals of time when the entity lists the good on the market place website. A value decay option may be set in a private mode such that the other entity is unaware of the value decay and/or a public mode such that the other entity is able to view the value decay option setting.

The method may include enabling the other entity to list a plurality of goods as being offered for trade in a variable combination according the specified value of the good. The entity may be able to trade the good for certain ones of the plurality of goods listed by the other entity. The other entity may list the goods with a bulk status when the other entity lists the goods. The bulk status of the goods may not be changed once the bulk status has been selected and the goods are listed by the other entity.

The method may include enabling the other entity to counter offer a triangle trade to the entity as a response to the offer of trade from the entity such the other entity agrees to provide the other good to the entity in exchange for the entity providing the good to a third party and the third party providing a third-party good to the other entity. The other entity may not be enabled to accept an original offer from the entity once the other party has counter offered the triangle trade. The third party may use the triangle trade module to generate the triangle trade between the third party, the entity and/or the other entity. Third parties may use the triangle trade module to generate a triangle trade.

The method may include enabling the entity to list a proposal template such that the other entity is able to complete the proposal template and such that the entity is enabled to offer to trade the good for a certain good described in the proposal template as completed by the other entity.

In yet another aspect, a method of e-commerce include configuring a server to permit an entity to list the good to a list of goods available for trade on a market place accessible through a computer network, configuring a server to permit the entity to assign a value to a good of an entity, configuring the server to permit the entity to perform a search of a specified set of goods available on the list of goods according to a set of rules, and configuring the server to control the behavior of the entity according to the specified set of rules such that the entity is able to propose the trade to the other entity if the value of the good is of an equal to another value and greater than the other value of the other good and such that the entity is able to only propose to the other entity to trade the good for the other good once and such that the entity is not able to alter the value of the good once the entity has listed the good.

The method may include configuring the server to permit the entity to propose goods to the other entity to trade for the other good if the combined value of the goods is equal and greater than the other value of the other good. The method may include configuring the server to remove the listing of the good after a specified period of time. The method may include configuring the server to reduce the value of the good by a specified amount at a series of temporal intervals. The method may also include configuring the server to permit the other entity to list goods as being offered for trade in a variable combination according to the value of the goods.

The method may configure the server to permit the other entity to counter offer a triangle trade to the entity as a response to the offer of trade from the entity such that the other entity agrees to provide the other good to the entity in exchange for the entity providing the good to a third party and the third party providing a third-party good to the other entity. In addition, the method may configure the server to permit the entity to list a proposal template such that the other entity is able to complete the proposal template.

The other entity may list a number of other goods as available according to a specified quantity or according to a set of rules such that the entity may offer to trade the good for a specified quantity of other goods that are equal to and/or greater than the value of the good. The bulk status of the plurality of goods may not be removed. Other entity may not be permitted to accept an original offer from the entity once the other party may have counter offered the triangle trade. The third party may use the triangle trade module to generate the triangle trade between the third party, the entity and/or the other entity. The goods that may be members of the set of bulk items may not be homogenous.

The methods, systems, and apparatuses disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which:

FIG. 4 is a user interface view illustrating online trading details, according to one embodiment.

Figure 1:
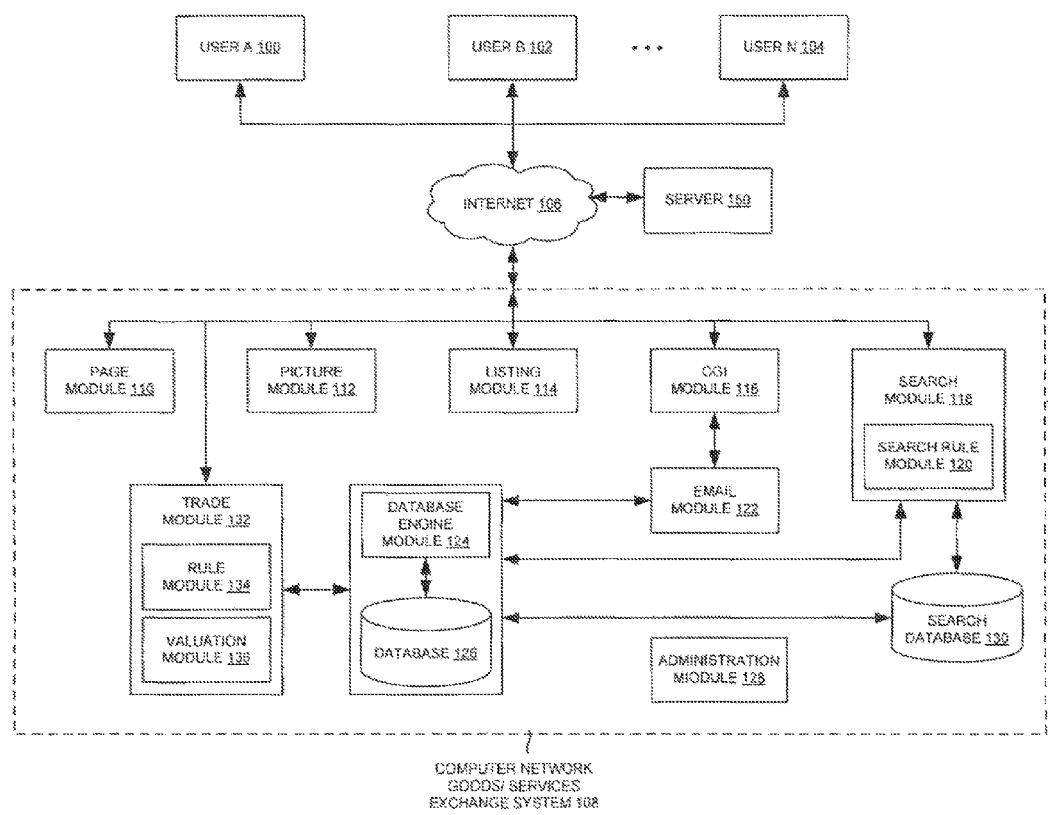
FIG. 1 is a system view of users trading in a computer network goods/services exchange system through an internet, according to one embodiment.

Other features of the present embodiments will be apparent from the accompanying drawings and from the detailed description that follows.

DETAILED DESCRIPTION

A method, apparatus, and system of facilitating value-based bartering over the internet are disclosed. Although the present embodiments have been described with reference to specific example embodiments, it will be evident that various modifications and changes may be made to these embodiments without departing from the broader spirit and scope of the various embodiments.

In one embodiment, a system of e-commerce includes a computer network (e.g., the internet 106 of FIG. 1), a server 150 to host a market place website, a listing module (e.g., the listing module 114 of FIG. 1) to enable an entity to assign a specified value to a good and to list the good (e.g., using the value assignment module 226 of FIG. 2) for trade on the market place website such that the listing of the good will expire after being posted for a specified period of time, a trade module (e.g., the trade module 132 of FIG. 1) to enable an entity to trade the good for another good of another entity on the market place website, a search module (e.g., the search module 118 of FIG. 1) to enable the entity to search a list of goods (e.g., using the search module 118) on the market place website, and a rule module (e.g., the rule module 134 of FIG. 1) to govern a trade between the entity and the other entity of the good for the other good such that the entity is able to propose the trade to the other entity if the specified value of the good is of an equal value equal to another specified value of the other good and/or a greater-than value greater than the other specified value and such that the entity is able to only propose the trade to the other entity once and such that the entity is not able to alter the specified value of the good once the entity has listed the good.

In another embodiment, a method includes assigning a specified value to a good (e.g., using the value assignment module 226 of FIG. 2) of an entity, listing the good (e.g., using the listing module 114 of FIG. 1) to a list of goods available for trade on a market place website, searching the list of goods (e.g., using the search module 118 of FIG. 1) for a specified type of goods, trading (e.g., using the trade module 132 of FIG. 1) the good for another good of another entity on the market place website according to a set of rules such that the entity is able to propose the trade to the other entity if the specified value of the good is of an equal value equal to another specified value of the other good and/or a greater-than value greater than the other specified value and such that the entity is able to only propose to the other entity to trade the good for the other good once and such that the entity is not able to alter the specified value of the good once the entity has listed the good.

In yet another embodiment, a method of e-commerce includes configuring a server 150 to permit an entity to list the good to a list of goods available for trade on a market place accessible through a computer network, configuring the server 150 to permit the entity to assign a value to a good of an entity, configuring the server 150 to permit the entity to perform a search (e.g., using the search module 118 of FIG. 1) of a specified set of goods available on the list of goods according to a set of rules, and configuring the server 150 to control the behavior of the entity according to the specified set of rules such that the entity is able to propose the trade to the other entity if the value of the good is one or more of an equal to another value and greater than the other value of the other good and such that the entity is able to only propose to the other entity to trade the good for the other good once and such that the entity is not able to alter the value of the good once the entity has listed the good. The embodiment may include a physical database 126 to structure a collection of data relating at least one of a listing module, a trade module, a search module and a rule module.

FIG. 1 is a system view of users trading in a computer network goods/services exchange system through an internet, according to one embodiment. Particularly, FIG. 1 illustrates an user A 100, an user B 102, an user N 104, an internet 106, a computer network goods/services exchange system 108, a page module 110, a picture module 112, a listing module 114, a CGI module 116, a search module 118, a search rule module 120, an email module 122, a database engine module 124, a database 126, an administration module 128, a search database 130, a trade module 132, a rule module 134, and a valuation module 136, according to one embodiment.

The user A 100, the user B 102, the user N 104, etc. may be the patrons (e.g., entities, etc.) who may trade (e.g., offer, purchase, etc.) their good/services on the computer network goods/services exchange system 108 based on a value of their goods. The internet 106 may be a global network of interconnected networks for communication of devices (e.g., computers, mobile devices, etc.). The computer network goods/services exchange system 108 may be an e-commerce system that may enable the users (e.g., entities, patrons, etc.) of the network to exchange their goods/services based on the value of the goods. The page module 110 may enable presentation/navigation of user interfaces in the computer network goods/services exchange system 108 website. The picture module 112 may enable presentation and illustration of goods/services associated to the users who are trading in the computer network goods/services exchange system 108.

The page module 110 may include a web server 150. The web server 150 may include a computer program that is responsible for accepting HTTP requests from web clients (e.g. a web browser), and serving HTTP responses along with optional data contents (e.g. web pages such as HTML documents and linked objects, images, etc.). The web server 150 may include a computer that runs a computer program as described above.

The listing module 114 may list the possible goods/services offered for purchase in the user interface of the computer network goods/services exchange system 108. The CGI module 116 may pass a user's request (e.g., search, account creation, navigation, offering for trade, etc.) to an application program and receives data back (e.g., response from the server 150) to forward to the user. The CGI module 116 may serve the computer graphic interface aspects of the system of FIG. 1. The search module 118 may enable the entity to search a list of goods or services, other entities, trade offers, etc. on the market place website. The search rule module 120 may define the rules (e.g., criteria, kind of queries, etc.) to enable the user to search for the good/service, entities, users, trade offers, etc. based on the preference of the user.

The email module 122 may enable the users to communicate with other users (e.g., patrons, other traders) associated to the market place website for trade related aspects. The database engine module 124 may be software component that a database management system may use to create, retrieve, update and/or delete data from the database 126. The database 126 may be an organized body of related information associated to the online goods/services exchange system. The administration module 128 may manage (e.g., user accounts, transactions, website, etc.) the computer network goods/services exchange system 108. The search database 130 may be an organized body of search related information associated to the market place data.

The trade module 132 may enable an entity (e.g., the user) to trade the good for another good of another entity in the market place website. The rule module 134 may govern a trade between the entity and the other entity of the good for the other good. The valuation module 136 may manage the values of a good (e.g., value assignment, decaying values, value combination, value purchase, etc.) of an entity to another good of another entity based on rules associated to the rule module 134.

In example embodiment, the users may communicate (e.g., trade) with the computer network goods/services exchange system 108 for trading through the internet 106. The computer network goods/services exchange system 108 may include page module 110, the picture module 112, the listing module 114, the CGI module 116, the search module 118, the email module 122, the database engine module 124, the trade module 132, the administration module 128 and the search database 130 communicating with each other. The search module 118 may include the search rule module 120. The search module 118 may communicate with the search database 130.

The search database 130 may communicate with the database 126 and/or the database engine module 124. The trade module 132 may include the rule module 134, the valuation module 136.

When the user requests a Web page (e.g., a good/service by clicking on a highlighted word, entering a Web site address, etc.), the system sends back the requested page (e.g., that may include the good/service the user was looking for, result for search query, etc.). The database engine module 124 may be managed (e.g., commanded) via the DBMS's (Data Base Management System) own user interface, and may be sometimes through a network port. The rule module 134 may govern in a way such that the entity is able to propose the trade to the other entity if the specified value of the good is of an equal value equal to another specified value of the other good and/or a greater-than value greater than the other specified value (e.g., such that the entity may be able to only propose the trade to the other entity once and that the entity may not able to alter the specified value of the good once the entity has listed the good).

In one embodiment, the server 150 may host the market place website. The listing module 114 may enable the entity to assign the specified value to the good (e.g., using the value assignment module 226 of FIG. 2) and to list the good for trade on the market place website (e.g., the listing of the good may expire after being posted for the specified period of time). The trade module 132 may enable the entity to trade the good for the other good of the other entity on the market place website. The search module 118 may enable the entity to search the list of goods on the market place website.

The rule module 134 may govern the trade between the entity and the other entity of the good for the other good. The entity may be able to propose the trade to the other entity if the specified value of the good is an equal value equal to the other specified value of the other good and a greater-than value greater than the other specified value (e.g., the entity may be able to only propose the trade to the other entity once and/or the entity may not be able to alter the specified value of the good once the entity has listed the good).

The rule module 134 may govern the trade between the entity and the other entity of the good for the other good. The entity may be able to propose the trade to the other entity if the specified value of the good is an equal value equal to the other specified value of the other good and a greater-than value greater than the other specified value (e.g., the entity may be able to only propose the trade to the other entity once and/or the entity may not be able to alter the specified value of the good once the entity has listed the good).

The other entity may be enabled to select a substitute good that may be of another equal value equal to the specified value and another less-than value lower than the specified value and such that the entity may have chosen to enable a counter proposal of a substitute good upon creation of the proposal of the good and such that another entity's selection of the substitute good may automatically generate a trade of the good for the substitute good.

Figure 2:
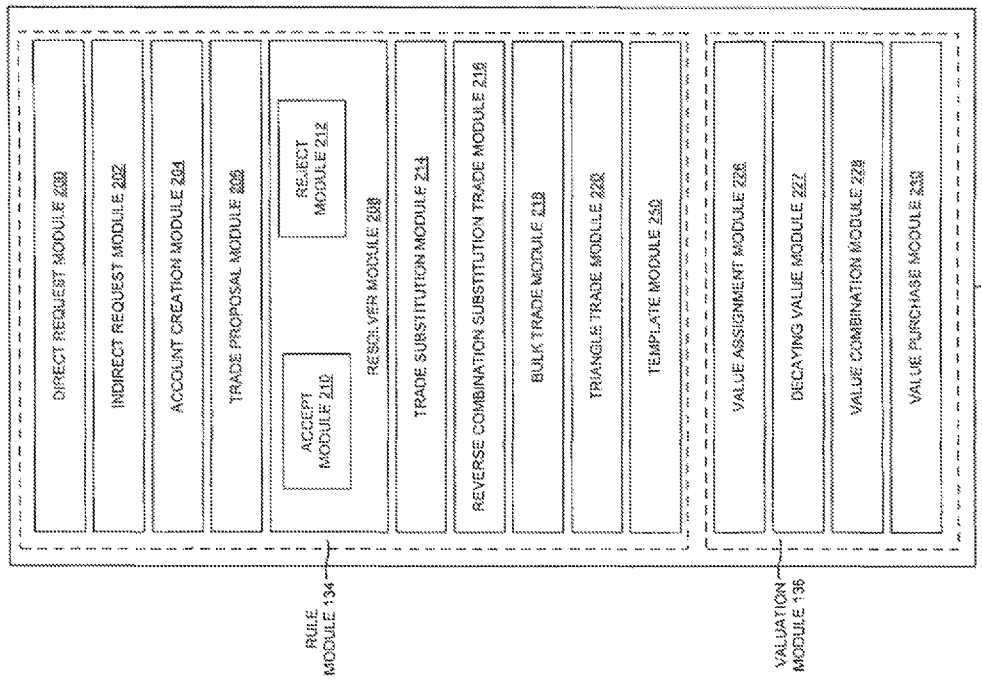
FIG. 2 is exploded view of trade module 132, according to one embodiment.

FIG. 2 is exploded view of trade module 132, according to one embodiment. Particularly, FIG. 2 illustrates the rule module 134, the valuation module 136, a direct request module 200, an indirect request module 202, an account creation module 204, a trade proposal module 206, a resolver module 208, a accept module 210, a reject module 212, a substitute trade module 214, a reverse combination substitution trade module 216, a bulk trade module 218, a triangle trade module 220, a value assignment module 226, a decaying value module 227 (e.g. can be a value decay module), a value combination module 228 and a value purchase module 230, according to one embodiment.

The direct request module 200 may enable the entity to communicate with the other user through the trade module for trading purposes (e.g., exchange of good/service). The account creation module 204 may assist the entity/user to create an account that enables the user/entity to trade in the online market place. The trade proposal module 206 may enable an entity to place a proposal to another entity for exchange of goods and/or services in the online market place.

The resolver module 208 may resolve the trade deals between the entities/users by enabling acceptance and rejection based on the preferences between the entities. The accept module 210 may enable an entity/user to accept an offer (e.g., good and/or service) proposed by another entity/user of the online market place. The reject module 212 may enable an entity to reject an offer (e.g., good and/or service) proposed by another entity of the online market place.

The bulk trade module 218 may enable the entity to list one or more goods as being offered for trade in a variable combination and to trade a good for certain ones of the goods. All of the bulk items in a set of bulk items may not have to be exactly the same. For example, a set of bulk items may include a sack of flower, a specified quantity of corn and a table. The triangle trade module 220 may enable trading good/services for more than two entities in combination between the entities.

The value assignment module 226 may manage the value for the good/service (e.g., assignment of values, decision on assigning values, etc.) that is offered for trading in the online market place. The value decay module 227 may indicate that the entity may have a decaying value based on criteria (e.g., may be time, market price, etc.). The value combination module 228 may manage (assigning values, etc.) the value for the combination of good/service of the entity that is offered for trading in the online market place. The value purchase module 230 may enable the entity to purchase the good/service based on the value of the good/service.

In example embodiment, the rule module 134 may include the direct request module 200, the indirect request module 202, the account creation module 204, the trade proposal module 206, the resolver module 208, the substitute trade module 214, the reverse combination substitution trade module 216, the bulk trade module 218, and the triangle trade module 220. The resolver module 208 may include accept module and the reject module 212. The valuation module 136 may include the value assignment module 226, the value decay module 227, the value combination module 228 and a value purchase module 230, according to one embodiment. The trade module 132 may include the rule module 134, the valuation module 136. The trade module 132 may manage the trading aspects of the online market place.

In one embodiment, the combination module may enable the entity to propose goods to the other entity to trade for the other good if the combined-specified value of the goods (e.g., may be calculated using the value combination module 228 of FIG. 2) of the equal value equal to the other specified value and a greater-than value greater than the other specified value.

The value decay module 227 may decrease the specified value of the good at specified set of intervals of time. The substitute proposal module may enable the other entity to select the substitute good that may be the other equal value equal to the specified value and the other less-than value lower than the specified value. The entity may have chosen to enable the counter proposal of the substitute good upon creation of the proposal of the good (e.g., the other entity's selection of the substitute good may automatically generate the trade of the good for the substitute good).

The entity may have the option to use the value decay module to decrease the specified value of the good at the set of specified intervals of time when the entity may initially list the good on the market place website. The value decay option may be set in the private mode. The other entity may be unaware that the value decay module 227 may decrease the specified value of the good at the set of specified intervals of time and the public mode (e.g., the other entity may be able to view the value decay option setting). The bulk trade module 218 may enable the other entity to list the goods as being offered for trade in the variable combination and the entity may be able to trade the good for certain ones of the goods. All of the bulk items in a set of bulk items may not have to be exactly the same. For example, a set of bulk items may include a sack of flower, a specified quantity of corn and a table.

The other entity may list the goods with the bulk status when the other entity lists the goods. The bulk status of the goods may not be changed once listed. The triangle trade module 220 may enable the other entity to counter offer the triangle trade to the entity as the response to the offer of trade from the entity (e.g., the other entity may agree to provide the other good to the entity in exchange for the entity providing the good to the third party and the third party providing the third-party good to the other entity). The other entity may not be enabled to accept (e.g., using the accept module 210 of FIG. 2) the original offer from the entity once the other party may have counter offered the triangle trade (e.g., using the triangle trade module 220 of FIG. 2).

The third party may use the triangle trade module 220 to generate the triangle trade between the third party, the entity and/or the other entity. The template module 250 may enable the entity to list the proposal template such that the other entity may be able to complete the proposal template by listing the other good (e.g., using the listing module 114) in the proposal template if the other good may be of the class of goods allowed by the proposal template such that the entity may be enabled to propose the trade. The third parties may use the triangle trade module 220 to generate the triangle trade. A specified value may be assigned to a good of an entity.

The entity may be enabled to propose goods to the other entity to trade for the other good if the combined-specified value of goods (e.g., may be calculated using the value combination module 228 of FIG. 2) of the equal value equal to the other specified value and the greater-than value lower than the other specified value. The listing of the good may expire after being posted for a specified period of time. The specified value of the good may be decreased at specified intervals of time.

The entity may have an option to use a value decay module 227 to decrease the specified value of the good at specified intervals of time when the entity may list the good on the market place website. A value decay option may be set in a private mode such that the other entity may be unaware of value decay option and a public mode such that the other entity may be able to view the value decay option. The other entity may be enabled to list goods as being offered for trade in a variable combination according to the specified value of the good and the entity may be able to trade the good for goods.

The other entity may list the goods with a bulk status when the other entity lists the goods. The bulk status of goods may not be changed. The other entity may be enabled to counter offer a triangle trade (using the triangle trade module 220 of FIG. 2) to the entity as a response to the offer of trade from the entity such the other entity may agree to provide the other good to the entity in exchange for the entity providing the good to a third party and the third party providing a third-party good to the other entity.

The other entity may not be enabled to accept an original offer (e.g., using the accept module 210 of FIG. 2) from the entity once the other party has counter offered the triangle trade (e.g., using the triangle trade module 220 of FIG. 2). The third party may use the triangle trade module 220 to generate the triangle trade between the third party, the entity and/or the other entity. The entity may be enabled to list a proposal template such that the other entity may be able to complete the proposal template and such that the entity may be enabled to offer to trade the good for a certain good described in the proposal template as completed by the other entity.

Third parties may use the triangle trade module 220 to generate a triangle trade. The server 150 may be configured to permit an entity to list the good to a list of goods available for trade on a market place accessible through a computer network. The server 150 may be configured to permit the entity to assign a value to a good of an entity (using the value assignment module 226 of FIG. 2). The server 150 may be configured to permit the entity to perform a search (e.g., using the search module) of a specified set of goods available on the list of goods according to a set of rules (e.g., using the search rule module 120).

The server 150 may be configured to control the behavior of the entity according to the specified set of rules such that the entity may be able to propose the trade to another entity if the value of the good may be equal to another value and greater than the other value of the other good and such that the entity may be able to only propose to the other entity to trade the good for the other good once and such that the entity may not be able to alter the value of the good once the entity has listed the good.

The server 150 may be configured to permit the entity to propose goods to the other entity to trade for the other good if the combined value of the goods of equal and greater than the other value of the other good. The server 150 may be configured to remove the listing of the good after a specified period of time. The server 150 may be configured to reduce the value of the good by a specified amount at series of temporal interval. The server 150 may be configured to permit the other entity to list of goods as being offered for trade in a variable combination according to the value of the good.

The server 150 may be configured to permit the other entity to counter offer a triangle trade to the entity (e.g., using the triangle trade module 220 of FIG. 2) as a response to the offer of trade from the entity such that other entity may agree to provide the other good to the entity in exchange for the entity providing the good to a third party and the third party providing a third-party good to the other entity. The server 150 may be configured to permit the entity to list a proposal template such that the other entity may be able to complete the proposal template. The other entity may list a number of other goods that may be available according to a specified quantity according to a set of rules such that the entity may offer to trade the good for a specified quantity of other goods that may be equal to or greater than the value of the other goods.

A bulk status of the goods may not be removed. The other entity may not be permitted to accept (e.g., using the accept module 210) an original offer from the entity once the other party has counter offered the triangle trade. The third party may use the triangle trade module 220 to generate the triangle trade between the third party, the entity and the other entity.

Figure 3:
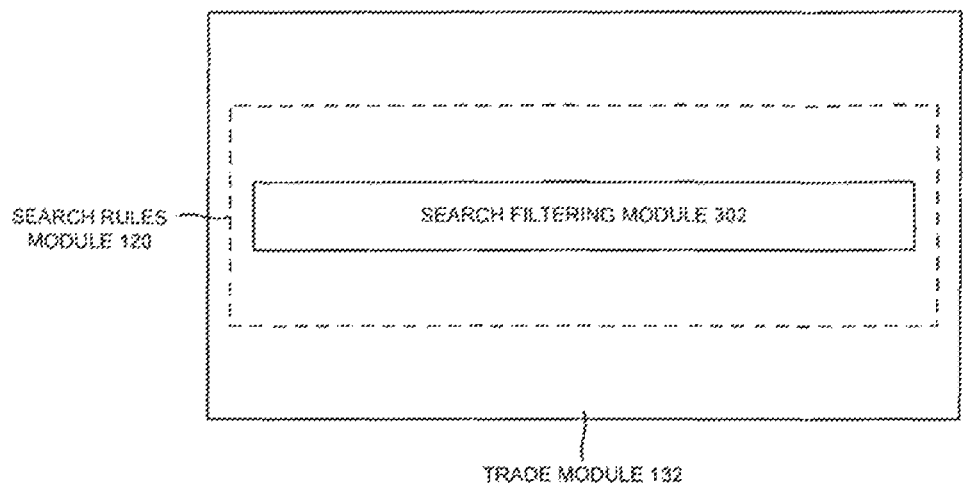
FIG. 3 illustrates the search rule module 120 of the trade module 132, according to one embodiment.

FIG. 3 illustrates the search rule module 120 of the trade module 132, according to one embodiment. Particularly, FIG. 3 illustrates the search rule module 120, a trade module 132, and a search filtering module 302, according to one embodiment.

The search filtering module 302 may filter the unrelated search results associated to the query that the entity uses to search another entity for goods and/or services. In example embodiment, FIG. 3 illustrates the search rule module 120 that may for a part of the trade module 132. The search rule module 120 may include the search filtering module 302.

In one embodiment, the good may be listed to a list of goods available for trade on a market place website. The list of goods may be searched for a specified type of goods (using the search rule module 120 of FIG. 1). The good may be traded for another good of another entity on the market place website according to a set of rules such that the entity may be able to propose the trade to the other entity if the specified value of the good may be an equal value equal to another specified value of the other good and a greater-than value greater than the other specified value and such that the entity may be able to only propose to the other entity to trade the good for the other good once and such that the entity may not be able to alter the specified value of the good once the entity may have listed the good.

Figure 4:
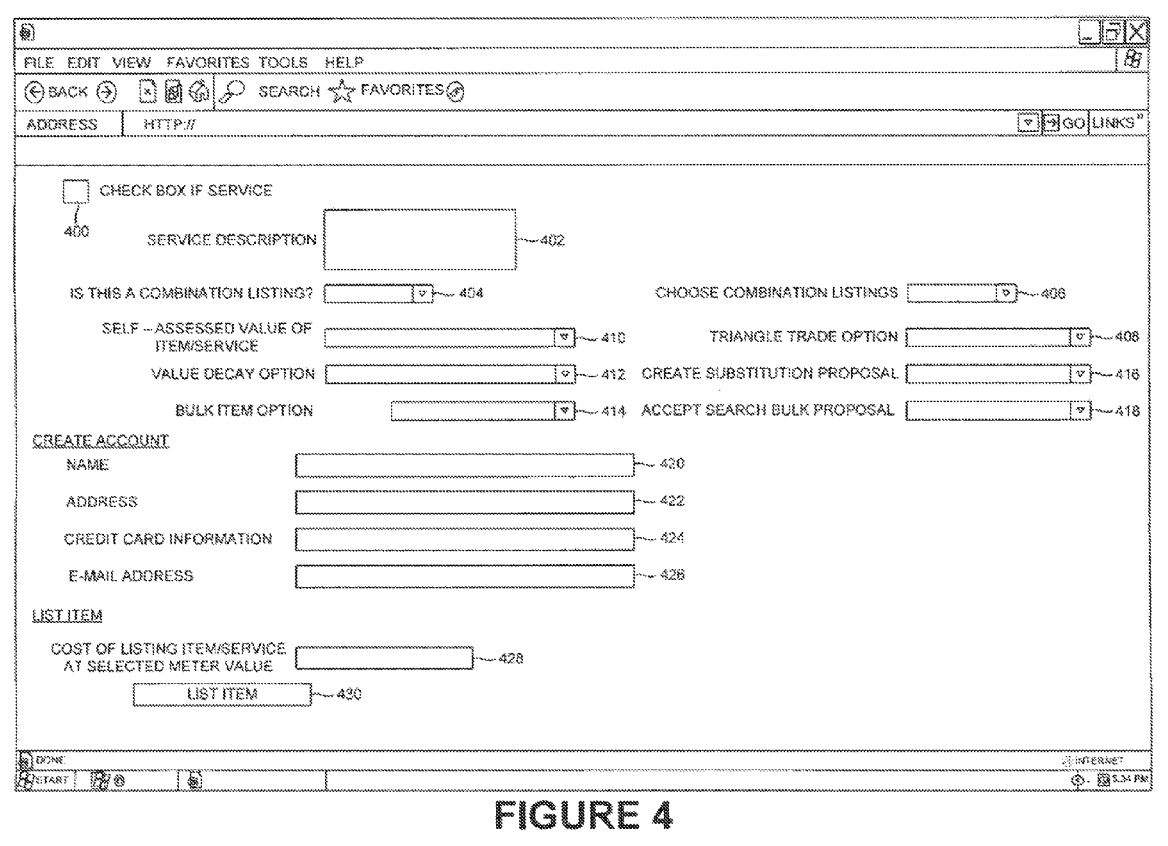

FIG. 4 is a user interface view illustrating online trading details, according to one embodiment. Particularly, FIG. 4 illustrates options 400-430, according to one embodiment.

FIG. 4 illustrates the user interface view where the user may be provided a set of options that may enable the website to understand the user needs and kind of trade that the user is planning to post. In example embodiment, "Check box if service" 400 option may provide an option for the entity/user to check if the request/response is associated to service. "Service description" 402 may provide an option for the entity/user to describe about the service that he may post (e.g., requesting, providing, etc) in the website. "Is this a combination proposal" 404 option may be an option that may enable the entity/user to choose "yes" or "no" that may illustrate that there may/may not be more than one good/service of listing. "Choose combination listings" 406 option may enable the entity/user to choose possible combinations of goods/services that the entity/user wants to post in website.

"Triangle trade" 408 option may enable the entity/user to choose a "yes" option or a "no" option that enables the entity/user to decide for triangle trade. "Self-assessed value of item/service" 410 may enable the user/entity to choose the value of item/service that he is posting. "Value decay option" 412 may enable the entity/user to provide an option (e.g., a "yes" option or a "no" option) that illustrates the other entity/user that the good may have a decay value. "Bulk item option" 414 may enable the entity/user to provide an option (e.g., a "yes" option or a "no" option) that illustrates the other entity/user, website that user may offer variable combination of certain ones of goods.

"Create substitution proposal" 416 option may enable the entity/user to provide an option (e.g., a "yes" option or a "no" option) that illustrates the other entity/user that the user may select a substitute good offer from the entity. "Search bulk proposal" 418 option may enable the entity/user to search a set of items involved in a bulk offer. "Name" 420 option of create account option enables the user/entity to create an account in the online market place so that the entity/user can start trading in the online market place. "Address" 422 option may enable the entity/user to provide address information in the text box which forms a part of process for creating an account. "Credit card information" 424 option may be an option that may enable the user to provide credit card information which forms a part of process for creating an account.

"E-mail address" 426 option may be a text box that may enable the entity/user to provide e-mail address that forms a part of process for creating an account. "Cost of listing item/service at selected meter value" 428 option may enable the entity/user to provide the cost of the listing item/service in the text box based on the entity/user preference. "List item" 430 option may enable the user to list the good/service based on user's preference based on the cost mentioned in option 428.

Figure 5:
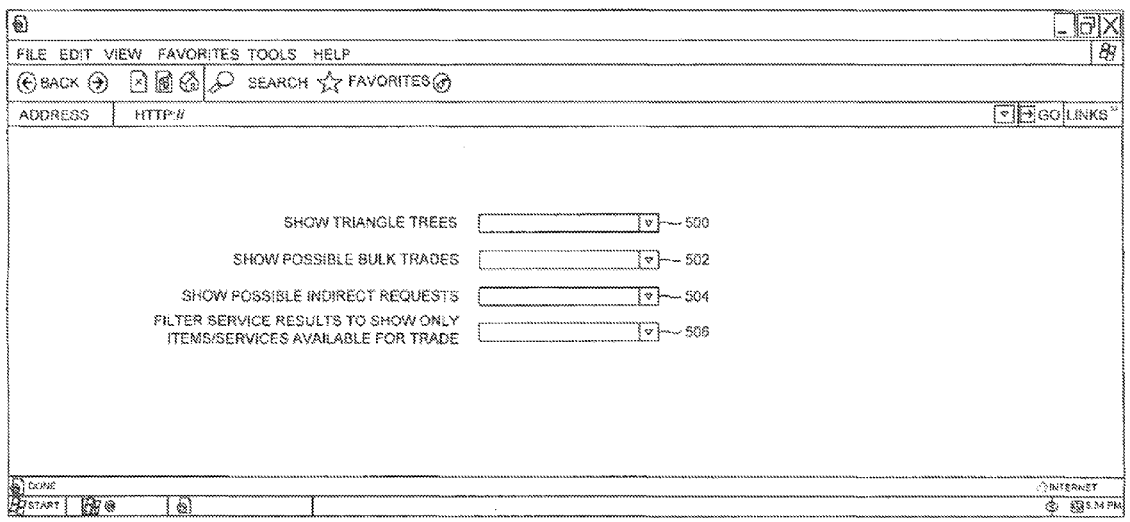
FIG. 5 is a user interface view that illustrates possible trade options for a user, according to one embodiment.

FIG. 5 is a user interface view that illustrates possible trade options for a user, according to one embodiment. Particularly, FIG. 5 illustrates options 500-506, according to one embodiment. In example embodiment, "show triangle trees" 500 option may illustrate the possible triangle trees that can be formed with the user for trade. "Show possible bulk trades" 502 option may illustrate the bulk trades that the user can opt for trading purposes. "Show possible indirect requests" 504 option may illustrate the possible trade requests that the user can make indirectly to other users for trading purposes. "Filter service results to show only items/services available for trade" 506 option may illustrate only items/services that may be available for trade.

Figure 6:
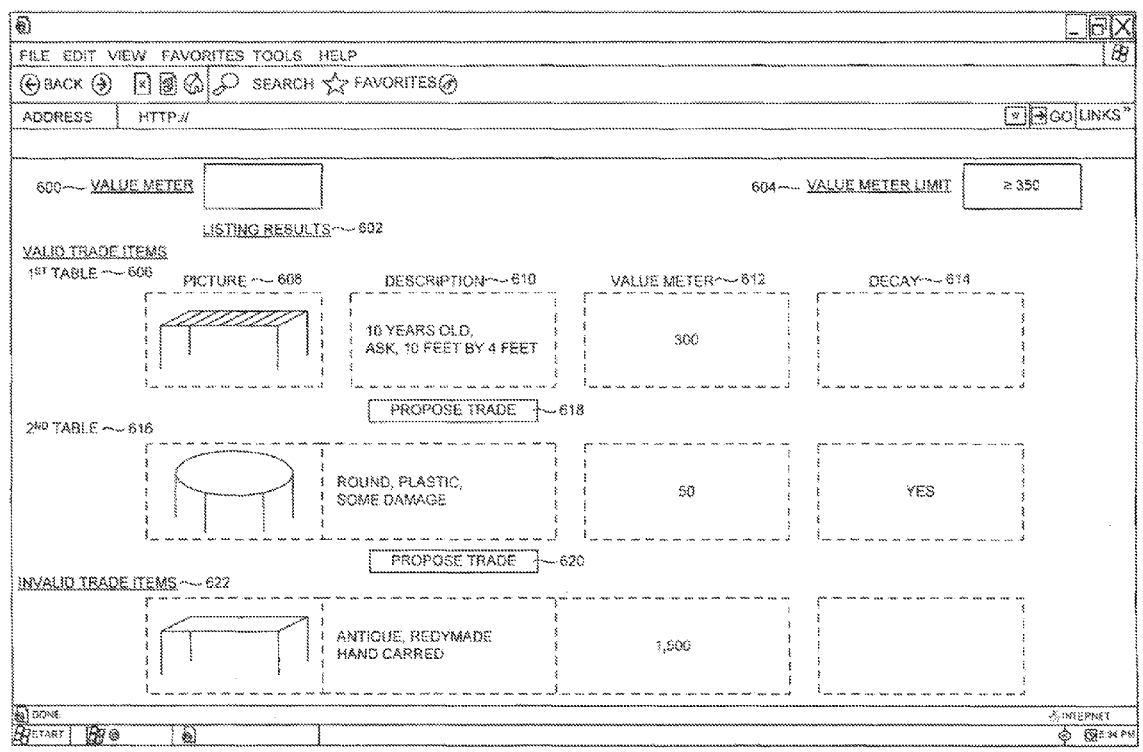
FIG. 6 is a user interface view that illustrates trade items that the user may wish to trade based on certain criteria, according to one embodiment.

FIG. 6 is a user interface view that illustrates trade items that the user may wish to trade based on certain criteria, according to one embodiment. Particularly, FIG. 6 illustrates options 600-622, according to one embodiment. In example embodiment, a value meter 600 option may enable the user to provide a value for searching an item in the online market environment. A listing results 602 option may list the nearby matching results based on the value entered in the option 600. A value meter limit 604 may illustrate threshold value (e.g., ≥350) that the user may prefer to trade using the listed items. "$1^{st}$ table" 606 may be a first listed item that is available for trade. A picture 608 option may illustrate pictures of trade items being displayed. A description 610 option may provide description of trade items being displayed. A value meter 612 may illustrate the value of the trade items being displayed.

A decay 614 option may illustrate whether the value of trade items being displayed may decay based on various criteria. "$2^{nd}$ table" 616 may be a second listed item that is available for trade. A propose trade 618-620 options may enable the user of the page to propose a trade with the owner of the item. An invalid trade item 622 may illustrate a trade item that is not valid based on any of the criteria of the user (e.g., value meter limit ≥350, whereas value of the invalid item is 1500).

Figure 7:
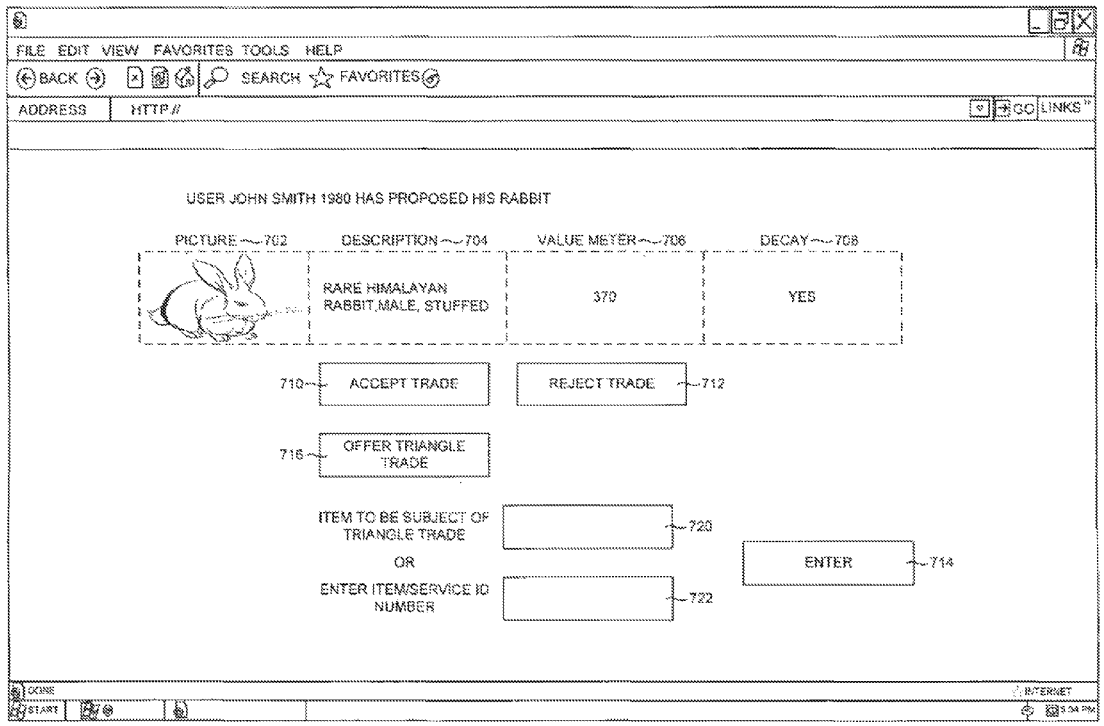
FIG. 7 is a user interface view that illustrates a proposal to a user from another user, according to one embodiment.

FIG. 7 is a user interface view that illustrates a proposal to a user from another user, according to one embodiment. Particularly, FIG. 7 illustrates options 702-723, according to one embodiment. FIG. 7 illustrates a user interface view that includes a proposal made a John Smith 1980 and other options that enables the user of the page to trade with John Smith. In example embodiment, a picture 702 option may illustrate the item that John Smith is intending to trade. A description 704 option may provide description of trade item (e.g., rare Himalayan rabbit, stuffed, male) being displayed.

A value meter 706 may illustrate the value of the trade item being displayed (e.g., 370). A decay 708 option may illustrate whether the value of trade items being displayed may decay based on time. Accept trade 710 option may enable the user to accept the trade offer proposed by John Smith. Reject trade 712 option may enable the user to reject the trade offer proposed by John Smith. Enter button 714 option may enable the user to to finish an "entry" and begin the desired process. Offer triangle trade 716 option may enable the user to propose a triangle trade to John Smith such that another user can participate in the trade.

An item to be subject of triangle trade may be an option that enables the user to add an item that may be used for trading in triangle trade. Enter item/service ID number 722 option may enable the user to enter item/service ID number in the text box.

Figure 8A:
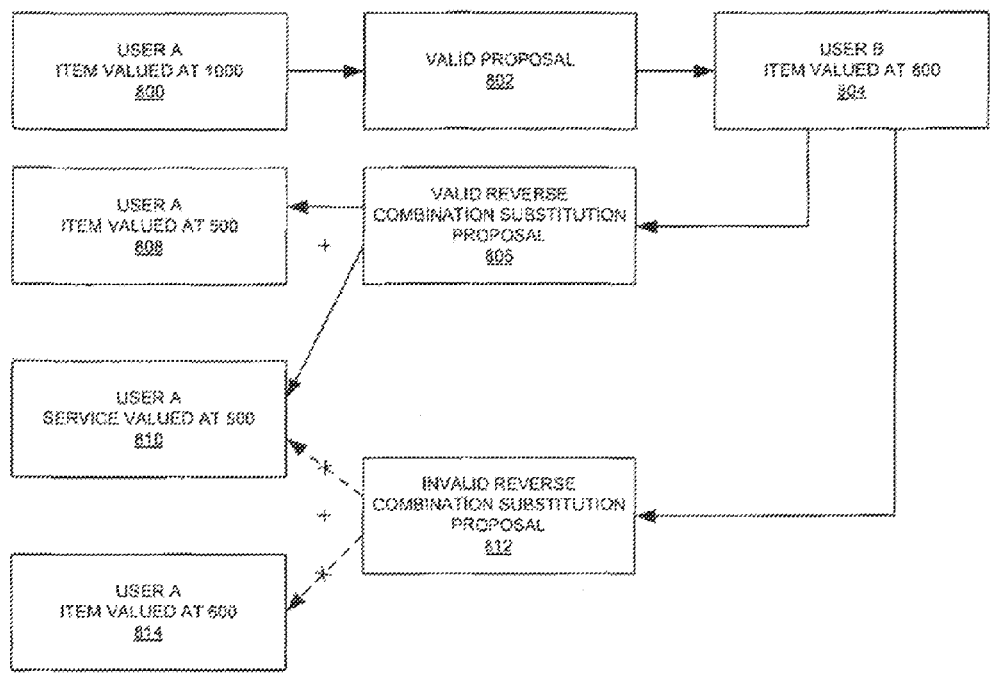
FIG. 8A illustrates a flow of process of proposal of trade and the responses, according to one embodiment.

The reverse combination substitution trade module 216 may allow a trade according to the process flow shown in FIG. 8A. FIG. 8A illustrates a flow of process of proposal of trade and the responses, according to one embodiment. In operation 800, user A item may be valued (e.g., using the value assignment module 226 of FIG. 2) at 1000 and a valid proposal may be sent to the user B in operation 802. In operation 804, the proposal may be/may not be accepted and the user B item may be valued at 800. In operation 806, user B may place a valid reverse combination substitution proposal (e.g., using the reverse combination substitution trade module 216 of FIG. 2). In operation 808 and 810, the reverse combination substitution proposal may be accepted and item may be valued at 500. If the user B sends an invalid reverse combination substitution proposal, the user A item may be valued at 500 and 600.

Figure 8B:
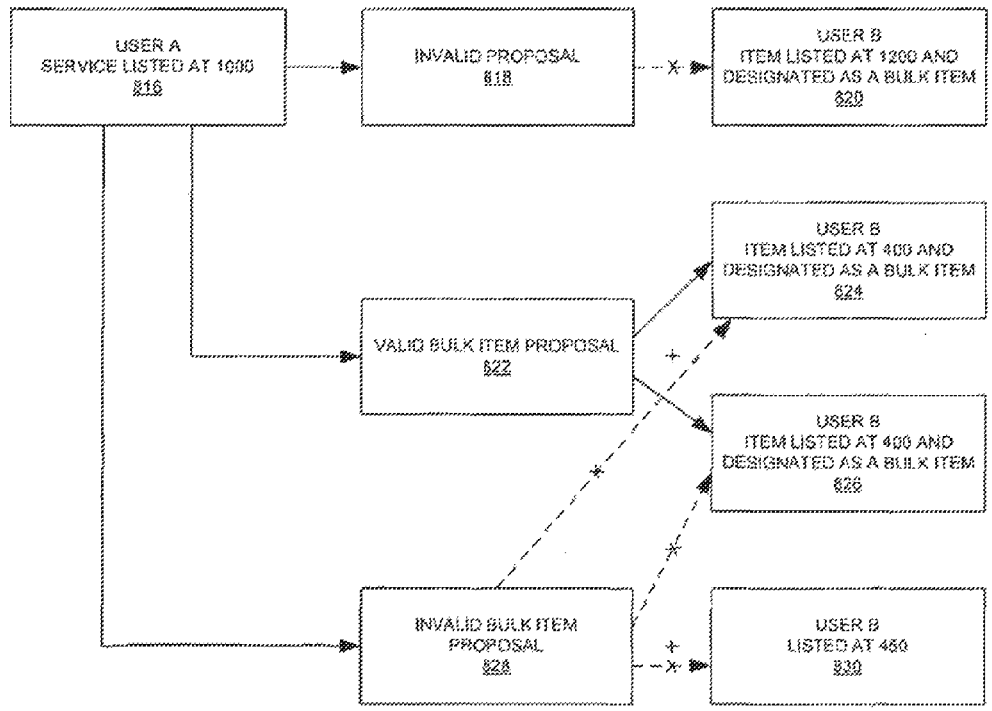
FIG. 8B illustrates a flow of process of proposal of trade and the responses, according to one embodiment.

The bulk trade module 218 may allow a trade according to the process flow shown in FIG. 8B. FIG. 8B illustrates a flow of process of proposal of trade and the responses, according to one embodiment. In operation 816, user A service may be listed at 1000 and if an invalid proposal is sent then the user B item may be listed 1200 and may be designated as a bulk item in operation 820. In operation 822 the user A may send a valid bulk item proposal (e.g., using the bulk trade module) to the user B. In operation 824 and 826, the proposal may be accepted and the user B item may listed at 400 and designated as a bulk item. If an invalid bulk item proposal is sent in operation 828 then the user B item may be listed as several bulks items (e.g. items of boxes 824, 826 and 830 with a combined value at 1250) with a combined value greater than the item of User A (e.g. valued at 1000).

Figure 9:
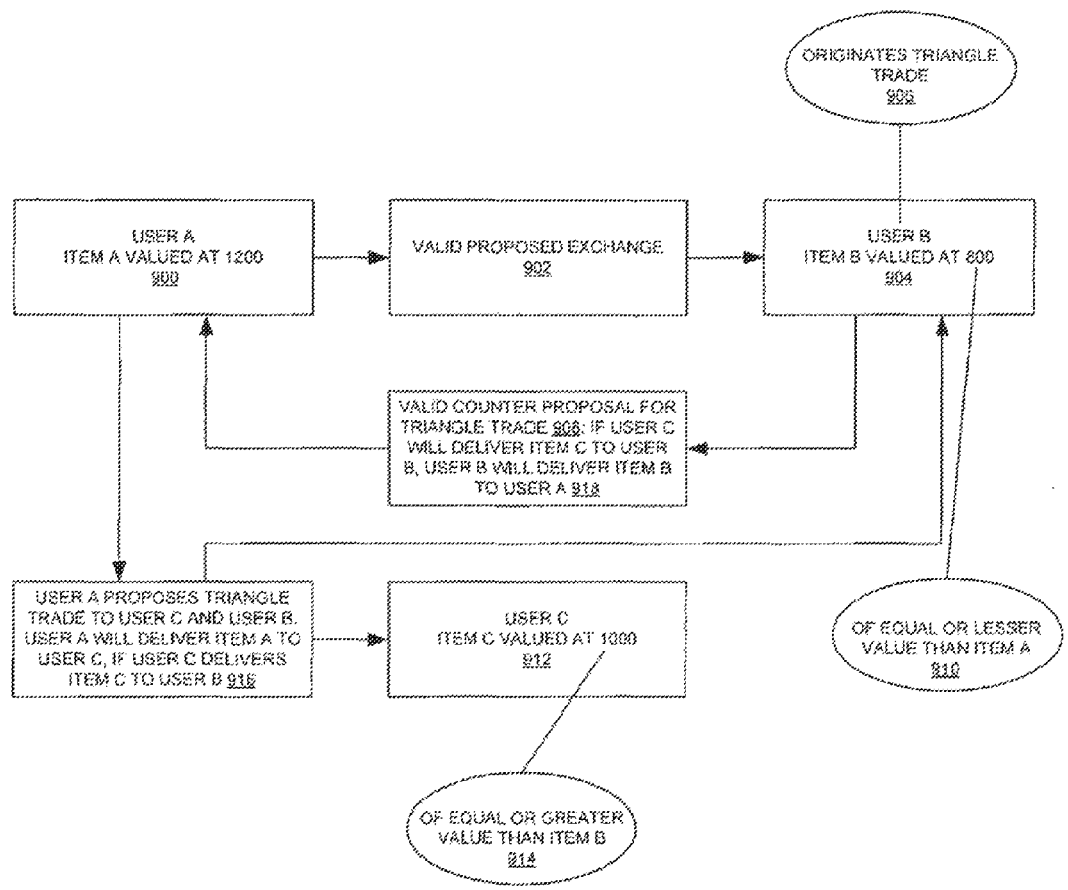
FIG. 9 illustrates a flow of process of proposal of triangle trade and the responses, according to one embodiment.

The triangle trade module 220 may allow a trade according to the process flow shown in FIG. 9. FIG. 9 illustrates a flow of process of proposal of triangle trade and the responses, according to one embodiment. In operation 900, the user A item A may be valued at 1200. In operation 902, there may be valid trade proposed exchange between the user A and user B.

In operation 904, the user B item B may be valued at 800. In operation 906 the user B may initiate a triangle trade. In operation 908, there may be valid counter proposal for triangle trade. In operation 910, a condition is determined so that the item B value is equal or lesser value than item A. In operation 912, user C item C may be valued at 1000. In operation 914, a condition may be determined such that value of item C is of equal or greater than the value of item B. In operation 916, user A may propose triangle trade to user C and user B, user A may delivers item A to user C, if the user C delivers item C to user B. In operation 918, if user C delivers item C to user B then user B may deliver the item B to user A.

Figure 10:
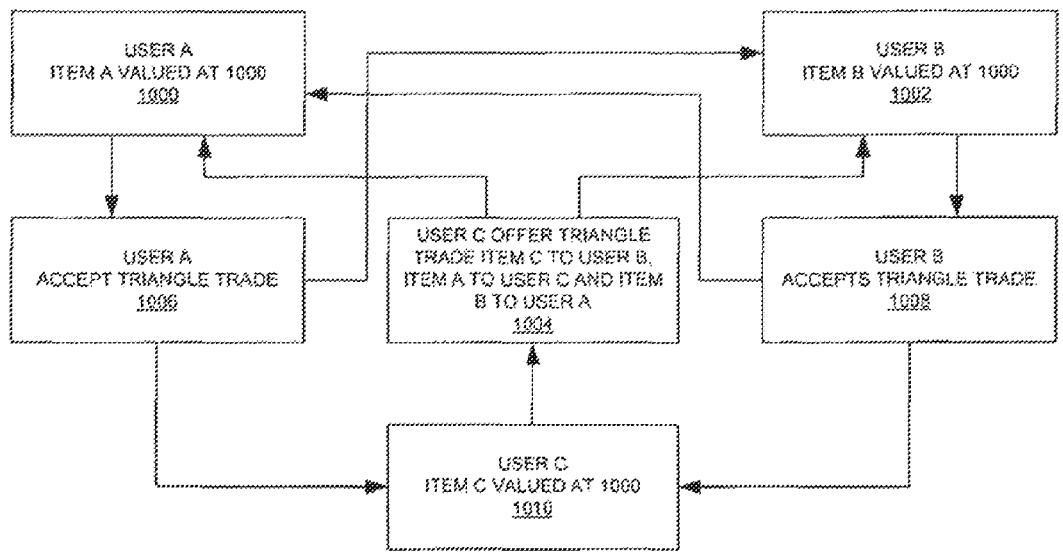
FIG. 10 illustrates a flow of process of triangle trade, according to one embodiment.

The triangle trade module 220 may allow a trade according to the process flow shown in FIG. 10. FIG. 10 illustrates a flow of process of triangle trade, according to one embodiment. In operation 1000, the user A item may be valued at 1000. In operation 1002, the user B item may be valued at 1000. In operation 1004, the user C may offer triangle trade item C to user B, item A to user C and item B to user A. In operation 1006, the user A may accept triangle trade. In operation 1008, the user B may accept triangle trade. In operation 1010, the user C item C may be valued at 1000.

Figure 11:
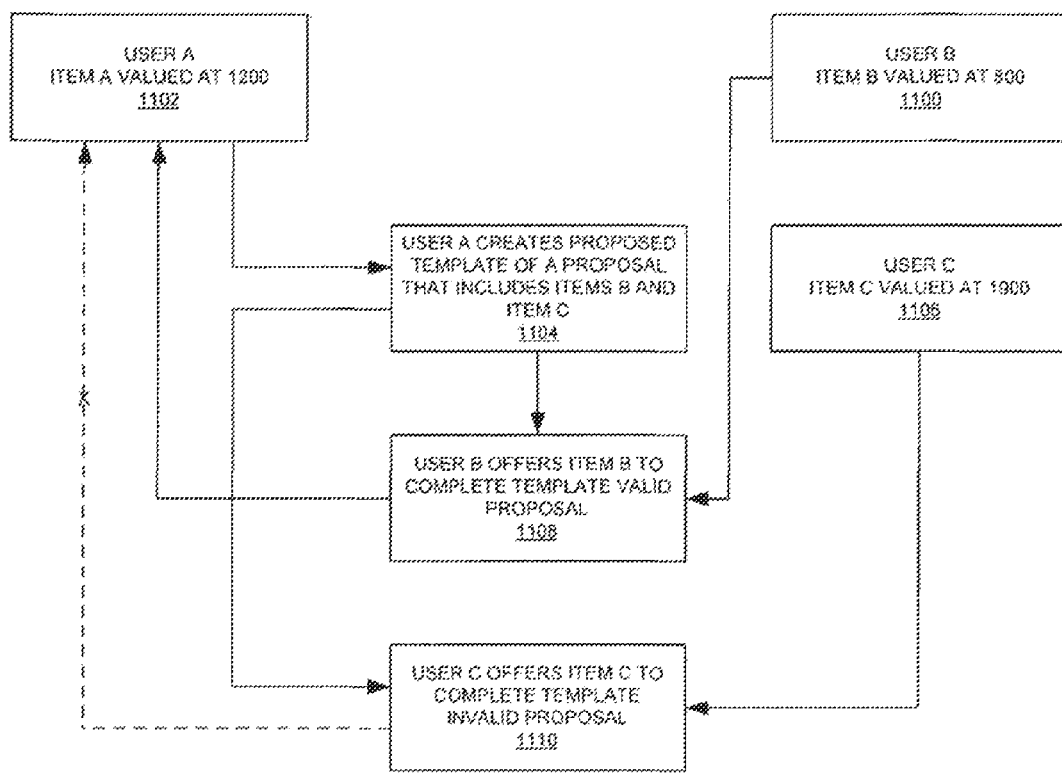
FIG. 11 illustrates a flow of process of direct request, according to one embodiment.

The direct request module 200 may allow a trade according to the process flow shown in FIG. 11. FIG. 11 illustrates a flow of process of direct request, according to one embodiment. In operation 1100, the user B item may be valued at 800. In operation 1102, the user A item may be valued at 1200. In operation 1104, the user A may create a proposed template of a proposal that includes items B and item C. In operation 1106, the user C item may be valued at 1900. In operation 1108, user B may offer item B to user A to complete template valid proposal. In operation 1110, user C may offer item C to complete template invalid proposal.

Figure 12:
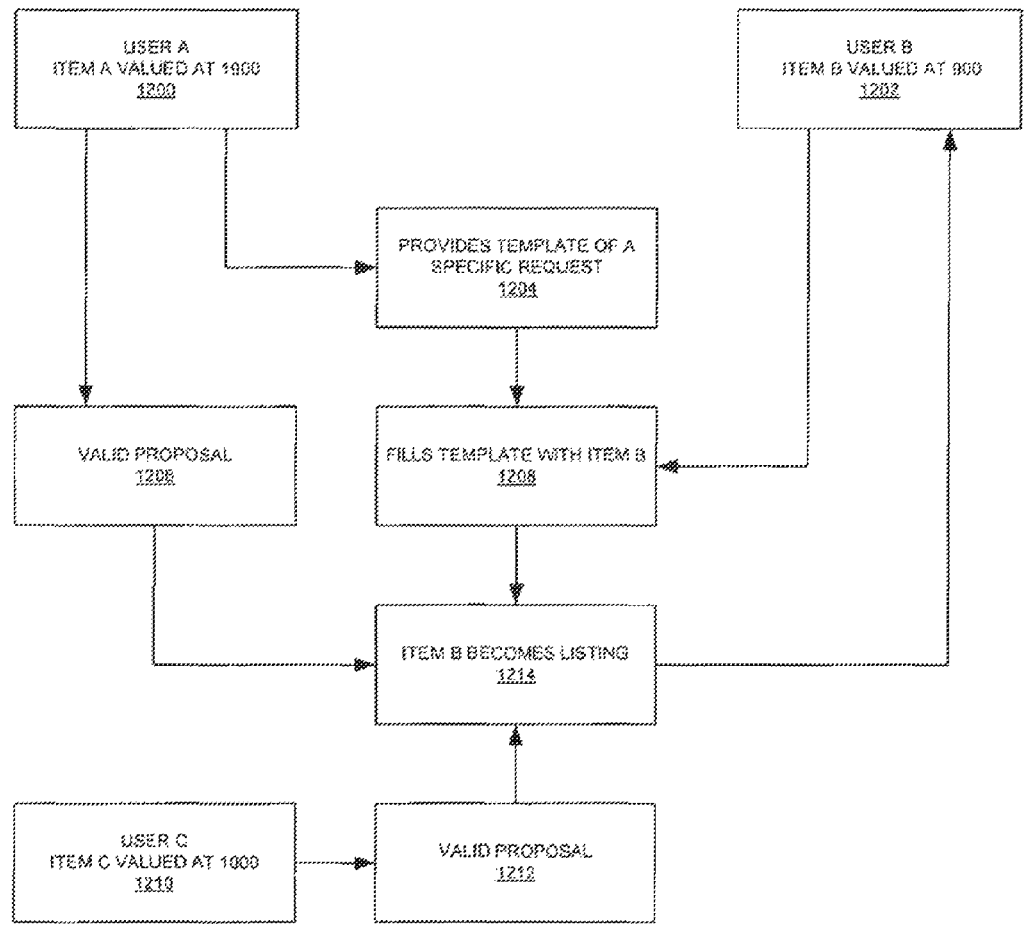
FIG. 12 illustrates a flow of process of indirect request, according to one embodiment.

The indirect request module 202 may allow a trade according to the process flow shown in FIG. 12. FIG. 12 illustrates a flow of process of an example indirect request, according to one embodiment. In operation 1200, the user A item may be valued at 1900. In operation 1202, the user B item may be valued at 900. In operation 1204, the user A may provide template of a specific request. In operation 1206, the user A may place a valid proposal. In operation 1208, the user B may fill the template provided by user A with item B. In operation 1210, the user C item C may be valued at 1000. In operation 1212, the user C may place a valid proposal. In operation 1214, item B may become listing. Also, in FIG. 12, if item B exceeds a value of 1900, then item B may still become a listing. However, in such a case, user A may not propose for item B.

Figure 13A:
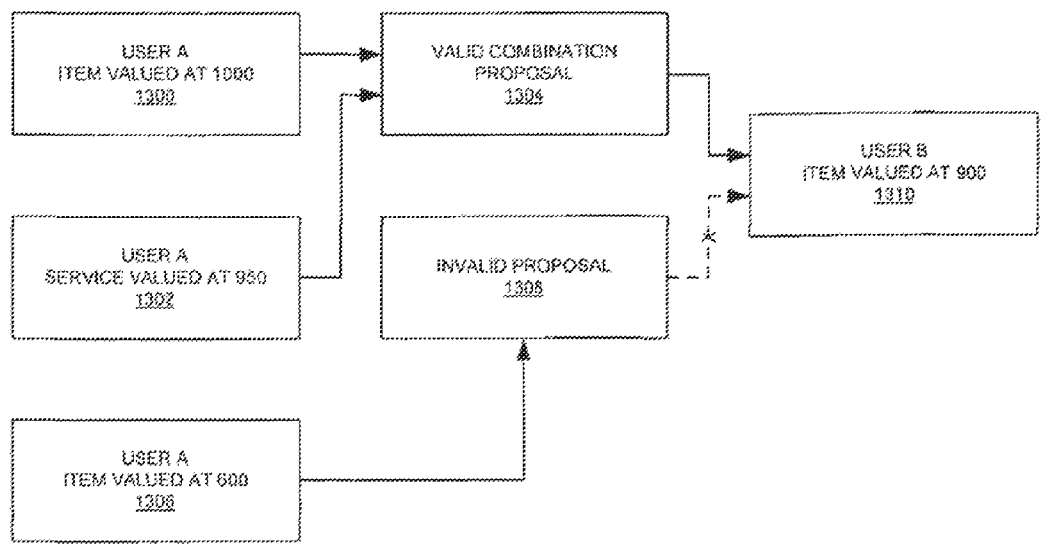
FIG. 13A illustrates a flow of process of trade proposals, according to one embodiment.

FIG. 13A illustrates a flow of process of trade proposals, according to one embodiment. In operation 1300, the user A item may be valued at 1000. In operation 1302, the user A service may be valued at 950. In operation 1304, a combination valid proposal may be placed by the user A. In operation 1306, the user A item may be valued at 600. In operation 1308, the user A may place an invalid proposal. In operation 1310, the user B item may be valued at 900.

Figure 13B:
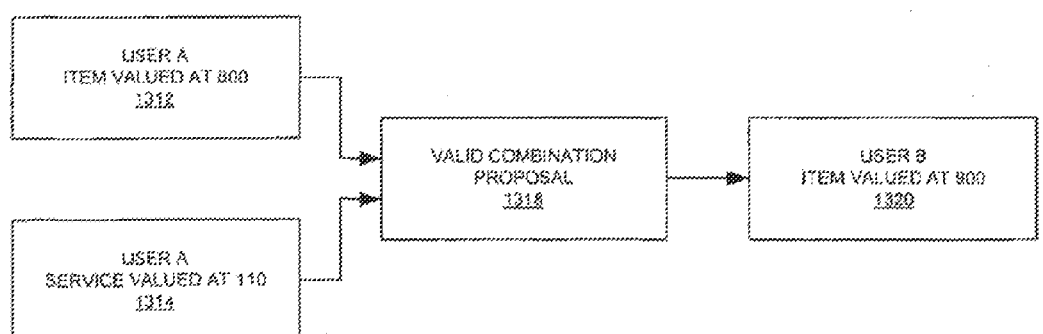
FIG. 13B illustrates a flow of process of trade and service combined proposals, according to one embodiment.

FIG. 13B illustrates a flow of process of trade and service combined proposals, according to one embodiment. In operation 1312, the user A item may be valued at 800. In operation 1314, the user A service may be valued at 110. In operation 1316, the user may place a combined proposal. In operation 1318, a valid combination proposal may be placed by the user A to the user B. In operation 1320, the user B item may be valued at 900.

Figure 14:
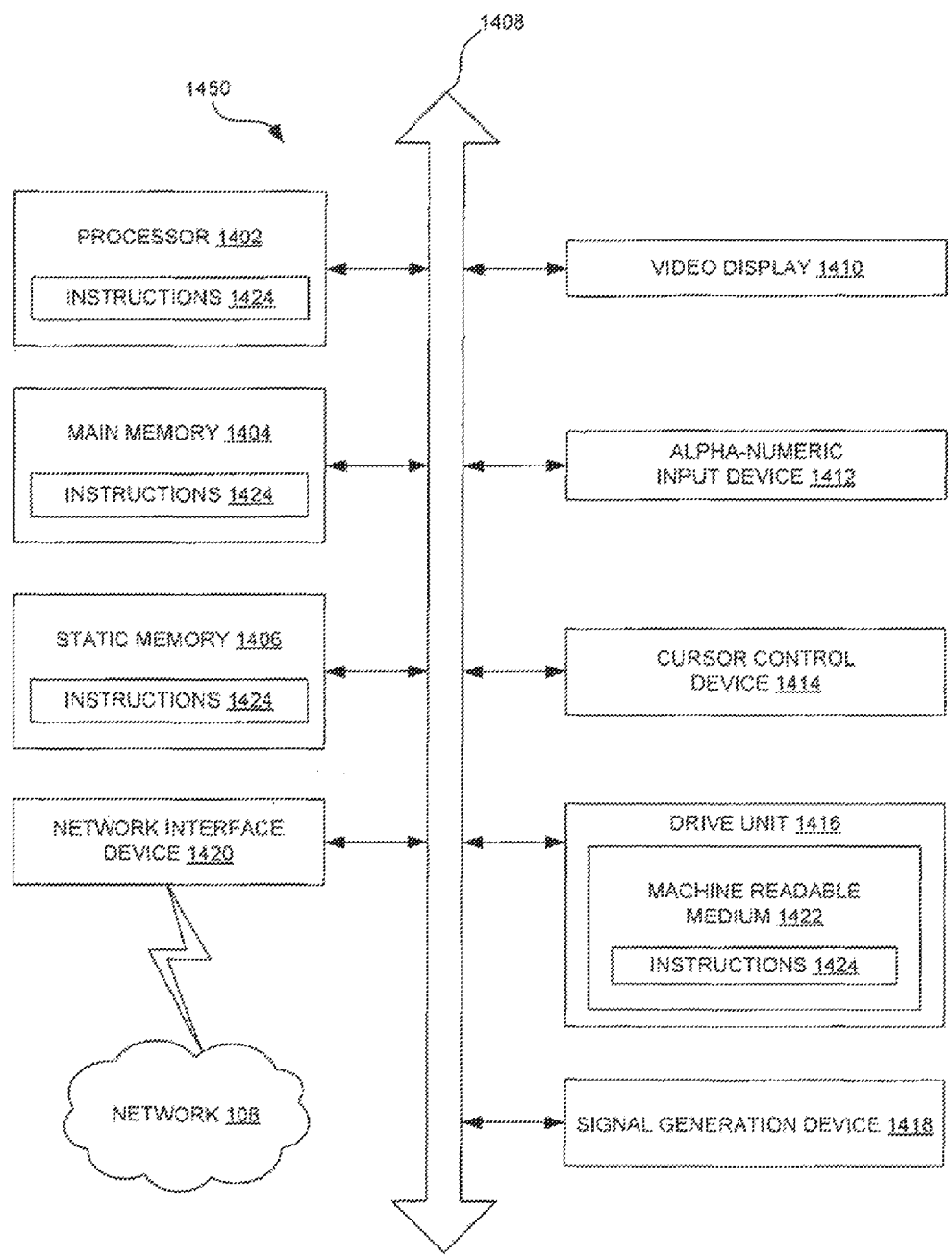
FIG. 14 is a diagrammatic system view of a data processing system in which any of the embodiments disclosed herein may be performed, according to one embodiment.

FIG. 14 is a diagrammatic system view of a data processing system in which any of the embodiments disclosed herein may be performed, according to one embodiment. Particularly, the diagrammatic system view 1400 of FIG. 14 illustrates a processor 1402, a main memory 1404, a static memory 1406, a bus 1408, a video display 1410, an alpha-numeric input device 1412, a cursor control device 1414, a drive unit 1416, a signal generation device 1418, a network interface device 1420, a machine readable medium 1422, instructions 1424, and a network 1426, according to one embodiment.

The diagrammatic system view 1400 may indicate a personal computer and/or the data processing system in which one or more operations disclosed herein are performed. The processor 1402 may be a microprocessor, a state machine, an application specific integrated circuit, a field programmable gate array, etc. (e.g., Intel® Pentium® processor). The main memory 1404 may be a dynamic random access memory and/or a primary memory of a computer system.

The static memory 1406 may be a hard drive, a flash drive, and/or other memory information associated with the data processing system. The bus 1408 may be an interconnection between various circuits and/or structures of the data processing system. The video display 1410 may provide graphical representation of information on the data processing system. The alpha-numeric input device 1412 may be a keypad, a keyboard and/or any other input device of text (e.g., a special device to aid the physically handicapped).

The cursor control device 1414 may be a pointing device such as a mouse. The drive unit 1416 may be the hard drive, a storage system, and/or other longer term storage subsystem. The signal generation device 1418 may be a bios and/or a functional operating system of the data processing system. The network interface device 1420 may be a device that performs interface functions such as code conversion, protocol conversion and/or buffering required for communication to and from the network 106. The machine readable medium 1422 may provide instructions on which any of the methods disclosed herein may be performed. The instructions 1424 may provide source code and/or data code to the processor 1402 to enable any one or more operations disclosed herein.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

Particularly, the page module 110, the picture module 112, the listing module 114, the CGI module 116, the search module 118, the search rule module 120, an email module 122, the database engine module 124, the database 126, an administration module 128, the search database 130, the trade module 132, the rule module 134, the valuation module 136, the direct request module 200, an indirect request module 202, an account creation module 204, the trade proposal module 206, the resolver module 208, the accept module 210, the reject module 212, the substitute trade module 214, the reverse combination substitution trade module 216, the bulk trade module 218, the triangle trade module 220, the value assignment module 226, the value decay module 227, the value combination module 228 the value purchase module 230, and the search filtering module 302 of FIGS. 1-14 may be enabled using software and/or using transistors, logic gates, and electrical circuits (e.g., application specific integrated ASIC circuitry) such as a page circuit, a picture circuit, a listing circuit, a CGI circuit, a search circuit, a search rule circuit, an email circuit, a database engine circuit, a database, an administration circuit, a search database, a trade circuit, a rule circuit, a valuation circuit, a direct request circuit, an indirect request circuit, an account creation circuit, a trade proposal circuit, a resolver circuit, an accept circuit, a reject circuit, a substitute trade circuit, a reverse combination substitution trade circuit, a bulk trade circuit, a triangle trade circuit, a value assignment circuit, a value decay circuit, a value combination circuit, a value purchase circuit, a search filtering circuit and other circuit.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A computer-implemented system of e-commerce comprising:
   a computer network;
   a physical database that structures a collection of data relating a listing module, a trade module, a search module and a rule module;
   at least one processor that executes the listing module, the trade module, the search module and the rule module;
   a server that hosts, with at least one processor, a market place website;
   the listing module that enables an entity to assign a specified value to a good and to list the good for trade on the market place website such that the listing of the good will expire after being posted for a specified period of time;
   the trade module that enables the entity to trade the good for another good of another entity on the market place website;
   the search module that enables the entity to search a list of goods on the market place website; and
   the rule module that governs a trade between the entity and the other entity of the good for the other good such that the entity is able to propose the trade to the other entity wherein the rule module enforces a first rule that the specified value of the good is at least one of an equal value equal to another specified value of the other good and a greater-than value greater than the other specified value, wherein the rule module enforces a second rule that the entity is able to only propose the trade to the other entity once and wherein the rule module enforces a third rule that the entity is not able to alter the specified value of the good once the entity has listed the good.

2. The system of claim 1 further comprising:
   a combination module that enables the entity to propose a plurality of goods to the other entity to trade for the other good if a combined-specified value of the plurality of goods at least one of the equal value equal to the other specified value and the greater-than value greater than the other specified value; and
   a triangle trade module that enables the other entity to counter offer triangle trade to the entity as a response to the offer of trade from the entity such that the other entity provides another good to the entity in exchange for the entity providing the good to a third party and the third party provides a third party good to the other entity.

3. The system of claim 2 further comprising a value decay module that decreases the specified value of the good at specified set of intervals of time.

4. The system of claim 3:
further comprising a substitute proposal module that enables the other entity to select a substitute good that is at least one of another equal value equal to the specified value and another less-than value lower than the specified value and such that the entity has chosen to enable a counter proposal of a substitute good upon creation of the proposal of the good and such that another entity's selection of the substitute good automatically generates a trade of the good for the substitute good;
wherein the substitute proposal module provides the entity with an option to use the value decay module to decrease the specified value of the good at the set of specified intervals of time when the entity initially lists the good on the market place website;
wherein the substitute proposal module enables a value decay option that is set in at least one of a private mode such that the other entity is unaware that the value decay module decreases the specified value of the good at the set of specified intervals of time and a public mode such that the other entity is able to view a value decay option setting.

5. The system of claim 4:
further comprising a bulk trade module that enables the other entity to list a plurality of goods as being offered for trade in a variable combination and wherein the entity is able to trade the good for certain ones of the plurality of goods;
wherein the bulk trade module enables the other entity to list the plurality of goods with a bulk status when the other entity lists the plurality of goods; and
wherein the bulk trade module provides that the bulk status of the plurality of goods cannot be changed once listed.

6. The system of claim 5 further comprising a triangle trade module that enables the other entity to counter offer a triangle trade to the entity as a response to the offer of trade from the entity such the other entity agrees to provide the other good to the entity in exchange for the entity providing the good to a third party and the third party providing a third-party good to the other entity.

* * * * *